United States Patent

Sasaki et al.

[11] Patent Number: 5,604,166
[45] Date of Patent: Feb. 18, 1997

[54] DIELECTRIC CERAMIC COMPOSITION

[75] Inventors: Norio Sasaki; Yoshiharu Watanabe; Kouji Takahashi, all of Tokyo, Japan

[73] Assignee: TDK Corporation, Tokyo, Japan

[21] Appl. No.: 598,261

[22] Filed: Feb. 7, 1996

[30] Foreign Application Priority Data

Feb. 14, 1995 [JP] Japan .................. 7-025695

[51] Int. Cl.⁶ ............................... C04B 35/468
[52] U.S. Cl. ............................. 501/137; 501/138
[58] Field of Search ...................... 501/137, 138

[56] References Cited

U.S. PATENT DOCUMENTS

| | | | |
|---|---|---|---|
| 4,987,108 | 1/1991 | Takagi et al. | 501/138 |
| 4,988,468 | 1/1991 | Nishioka et al. | 501/137 |
| 5,202,814 | 4/1993 | Kohno et al. | 501/139 |
| 5,248,640 | 9/1993 | Sano et al. | 501/137 |
| 5,322,828 | 6/1994 | Sano et al. | 501/137 |
| 5,453,409 | 9/1995 | Kishi et al. | 501/138 |

FOREIGN PATENT DOCUMENTS

| | | |
|---|---|---|
| 2650211 | 5/1977 | Germany . |
| 3524193 | 1/1986 | Germany . |
| 3224105 | 9/1988 | Japan . |
| 3-65558 | 3/1991 | Japan . |
| 3-65557 | 3/1991 | Japan . |
| 3109256 | 5/1991 | Japan . |

*Primary Examiner*—Mark L. Bell
*Assistant Examiner*—David Sample
*Attorney, Agent, or Firm*—Oblon, Spivak, McClelland, Maier & Neustadt, P.C.

[57] ABSTRACT

A dielectric ceramic composition having the composition represented by formula (1):

$$(BaTiO_3)_e+(BaZrO_3)_f+(CaTiO_3)_g+(MgTiO_3)_h+(R1+R2+R3+R4)\quad(1)$$

wherein e is from 60.3 to 67.5 mol %, f is from 11.9 to 15.6 mol %, q is from 15.8 to 23.0 mol %, and h is from 2.6 to 5.8 mol %, provided that the total of e, f, q, and h is 100 mol %; and R1 is from 0.05 to 0.4 wt % of NiO, R2 is from 0.05 to 0.3 wt % of $CeO_2$, R3 is from 0.03 to 0.2 wt % of MnO, and R4 is from 0.0 to 0.25 wt % of $SiO_2$, all based on 100 mol % in total of $BaTiO_3$, $BaZrO_3$, $CaTiO_3$, and $MgTiO_3$.

3 Claims, No Drawings

DIELECTRIC CERAMIC COMPOSITION

FIELD OF THE INVENTION

This invention relates to a dielectric ceramic composition, more particularly to a high dielectric constant dielectric ceramic composition which is suitable for high voltage condensers having a dielectric constant of 4,000 or more and a high breakdown voltage.

BACKGROUND OF THE INVENTION

High dielectric constant dielectric ceramic compositions in which a ceramic composition of $BaTiO_3$-$BaZrO_3$-$CaTiO_3$-$MgTiO_3$ system is used as the main component (JP-A-3-65557 and JP-A-3-65558) are broadly used as ceramic condensers, multilayer capacitors, high frequency condensers, high voltage condensers and the like. (The term "JP-A" as used herein means an unexamined published Japanese patent application.)

However, since such conventional dielectric ceramic compositions of $BaTiO_3$-$BaZrO_3$-$CaTiO_3$-$MgTiO_3$ system is ferroelectric, it is difficult to ensure a high alternating breakdown voltage of 4 kV/mm or more by reducing dielectric loss when the relative dielectric constant is 4,000 or more.

SUMMARY OF THE INVENTION

In view of the above, it therefore becomes an object of the present invention to provide a high dielectric constant dielectric ceramic composition which has a high relative dielectric constant of 4,000 or more and a high alternating breakdown voltage of 4 kV/mm or more and is small in dielectric loss.

Other objects and effects of the present invention will be apparent from the following description.

The present invention relates to a dielectric ceramic composition having the composition represented by formula (1):

$$(BaTiO_3)_e + (BaZrO_3)_f + (CaTiO_3)_q + (MgTiO_3)_h + (R1+R2+R3+R4) \quad (1)$$

wherein e is from 60.3 to 67.5 mol %, f is from 11.9 to 15.6 mol %, q is from 15.8 to 23.0 mol %, and h is from 2.6 to 5.8 mol %, provided that the total of e, f, q, and h is 100 mol %; and R1 is from 0.05 to 0.4 wt % of NiO, R2 is from 0.05 to 0.3 wt % of $CeO_2$, R3 is from 0.03 to 0.2 wt % of MnO, and R4 is from 0.0 to 0.25 wt % of $SiO_2$, all based on 100 mol % in total of $BaTiO_3$, $BaZrO_3$, $CaTiO_3$, and $MgTiO_3$.

By the use of the above composition, a dielectric ceramic composition which has a high relative dielectric constant of 4,000 or more and a high alternating breakdown voltage of 4 kV/mm or more and is small in dielectric loss and excellent in the degree of sintering can be obtained.

The composition composed of $BaTiO_3$, $BaZrO_3$, $CaTiO_3$, and $MgTiO_3$ is sometimes refereed to as a main composition, and NiO, $CeO_2$, MnO, and $SiO_2$ are sometimes referred to as additives.

DESCRIPTION OF PREFERRED EMBODIMENTS OF THE INVENTION

The present invention will be described in detail below by referring to preferred embodiments (examples) thereof, but the present invention is not construed as being limited thereto.

Production steps of the dielectric ceramic composition of the examples are described.

As starting materials, barium carbonate ($BaCO_3$), titanium oxide ($TiO_2$), zirconium oxide ($ZrO_2$), calcium carbonate ($CaCO_3$), magnesium carbonate ($MgCO_3$), nickel oxide (NiO), cerium oxide ($CeO_2$), manganese oxide (MnO) and silicon oxide ($SiO_2$) were weighed in such respective amounts that the compositions after sintering became respective compositions shown in Tables 1 and 2, and each of the thus prepared material mixtures was subjected to 16 hours of wet mixing using a pot mill, dehydrated and dried and then subjected to calcining at 1,160° to 1,200° C. to effect the chemical reactions.

After rough pulverization, this was finely pulverized using a pot mill, dehydrated and dried and then mixed with polyvinyl alcohol (PVA) as an organic binder, and the resulting mixture was subjected to granulation and size selection to obtain granular powder. The granular powder was subjected to molding under a pressure of 300 MPa to obtain a disc-like molded product of 16.5 mm in diameter and 1.1 mm in thickness.

The molded product was subjected to sintering at 1,280° to 1,340° C. in the air to obtain a ceramic material. Silver (Ag) paste was applied to both sides of the thus obtained ceramic material to form a print electrode to which was subsequently attached lead wire by soldering to obtain a ceramic condenser. Thereafter, electric properties of each of the thus obtained samples were measured, with the results shown in Tables 1 and 2.

In the measurement of each electric property shown in Tables 1 and 2, relative dielectric constant ($\epsilon s$) and dielectric loss ($\tan \delta$) were measured at a frequency of 1 kHz and a voltage of 1 V, insulation resistance (IR) was measured by applying a direct voltage of 500 V, breakdown voltage was defined as an alternating breakdown voltage per unit thickness (AC·$E_b$), and degree of sintering was examined using each sample which has been subjected to 1,320° C. of sintering and rated to excellent (⊚), good (○) and poor (X). The rate of change in capacitance (ΔC) was measured at 85° C. The range O means samples according to the present invention, and the range X means comparative samples.

TABLE 1

| Sample No. | Range | Main composition (mol %) | | | | Additives (wt %) | | | | ε s *1 | tan δ *2 (%) | IR (Ω) *3 × 10¹¹ | AC · Eb *4 (KV/mm) | ΔC (%) *5 85° C. | Sint. *6 |
|---|---|---|---|---|---|---|---|---|---|---|---|---|---|---|---|
| | | $BaTiO_3$ | $BaZrO_3$ | $CaTiO_3$ | $MgTiO_3$ | NiO | $CeO_2$ | MnO | $SiO_2$ | | | | | | |
| 1 | X | 58.4 | 12.5 | 26.3 | 2.8 | 0.20 | 0.18 | 0.05 | 0.00 | 2610 | 0.98 | 5.7 | 3.1 | −44 | ○ |
| 2 | O | 63.2 | 12.2 | 21.6 | 3.0 | 0.20 | 0.18 | 0.05 | 0.00 | 4612 | 0.72 | 6.0 | 4.8 | −49 | ○ |

TABLE 1-continued

| Sample No. | Range | Main composition (mol %) | | | | Additives (wt %) | | | | εs *1 | tan δ *2 (%) | IR (Ω) *3 ×10$^{11}$ | AC·Eb *4 (KV/mm) | ΔC (%) *5 85° C. | Sint. *6 |
|---|---|---|---|---|---|---|---|---|---|---|---|---|---|---|---|
| | | BaTiO$_3$ | BaZrO$_3$ | CaTiO$_3$ | MgTiO$_3$ | NiO | CeO$_2$ | MnO | SiO$_2$ | | | | | | |
| 3 | O | 64.5 | 12.6 | 19.9 | 3.0 | 0.20 | 0.18 | 0.05 | 0.00 | 4929 | 0.74 | 6.0 | 4.7 | −50 | O |
| 4 | O | 66.0 | 12.8 | 18.1 | 3.1 | 0.20 | 0.18 | 0.05 | 0.00 | 5240 | 0.75 | 6.0 | 4.6 | −53 | O |
| 5 | O | 67.5 | 13.0 | 16.3 | 3.2 | 0.20 | 0.18 | 0.05 | 0.00 | 5674 | 0.76 | 4.8 | 4.2 | −55 | O |
| 6 | O | 66.8 | 13.9 | 16.1 | 3.2 | 0.20 | 0.18 | 0.05 | 0.00 | 5280 | 0.56 | 5.0 | 4.3 | −53 | O |
| 7 | X | 67.4 | 13.9 | 14.0 | 4.7 | 0.20 | 0.18 | 0.05 | 0.00 | 4370 | 0.48 | 3.3 | 2.5 | −57 | O |
| 8 | O | 66.1 | 14.8 | 16.0 | 3.1 | 0.20 | 0.18 | 0.05 | 0.00 | 4948 | 0.45 | 6.0 | 4.4 | −54 | O |
| 9 | O | 65.5 | 15.6 | 15.8 | 3.1 | 0.20 | 0.18 | 0.05 | 0.00 | 4628 | 0.31 | 6.3 | 4.6 | −54 | O |
| 10 | X | 69.2 | 10.6 | 17.2 | 3.0 | 0.20 | 0.18 | 0.05 | 0.00 | 5930 | 1.90 | 5.1 | 2.7 | −41 | X |
| 11 | X | 67.5 | 9.6 | 19.8 | 3.1 | 0.20 | 0.18 | 0.05 | 0.00 | 4050 | 2.70 | 7.1 | 2.7 | −39 | X |
| 12 | O | 62.5 | 13.1 | 21.4 | 3.0 | 0.20 | 0.18 | 0.05 | 0.00 | 4409 | 0.81 | 6.5 | 4.8 | −53 | O |
| 13 | O | 63.9 | 13.4 | 20.1 | 2.6 | 0.20 | 0.18 | 0.05 | 0.00 | 4683 | 0.82 | 5.0 | 4.6 | −55 | O |
| 14 | O | 64.6 | 14.5 | 17.8 | 3.1 | 0.20 | 0.18 | 0.05 | 0.00 | 4626 | 0.76 | 7.0 | 4.6 | −54 | O |
| 15 | X | 63.8 | 14.8 | 19.3 | 2.1 | 0.20 | 0.18 | 0.05 | 0.00 | 4330 | 0.78 | 9.5 | 2.8 | −58 | O |
| 16 | X | 62.5 | 17.6 | 17.8 | 2.1 | 0.20 | 0.18 | 0.05 | 0.00 | 3450 | 0.64 | 8.0 | 4.6 | −60 | X |
| 17 | O | 60.3 | 12.8 | 23.0 | 3.9 | 0.20 | 0.18 | 0.05 | 0.00 | 4090 | 0.71 | 5.8 | 5.0 | −50 | O |
| 18 | O | 62.6 | 12.1 | 21.4 | 3.9 | 0.20 | 0.18 | 0.05 | 0.00 | 4634 | 0.61 | 3.3 | 4.5 | −50 | O |
| 19 | O | 61.9 | 12.0 | 21.2 | 4.9 | 0.20 | 0.18 | 0.05 | 0.00 | 4240 | 0.53 | 4.2 | 4.5 | −49 | O |
| 20 | O | 61.3 | 11.9 | 21.0 | 5.8 | 0.20 | 0.18 | 0.05 | 0.00 | 4176 | 0.71 | 4.1 | 4.7 | −47 | O |
| 21 | X | 65.6 | 12.5 | 15.6 | 6.3 | 0.20 | 0.18 | 0.05 | 0.00 | 3220 | 0.91 | 6.0 | 4.1 | −51 | X |

*1, dielectric constant;
*2, dielectric loss;
*3, insulation resistance;
*4, breakdown voltage;
*5, rate of change in capacitance;
*6, degree of sintering

TABLE 2

| Sample No. | Range | Main compositon (mol %) | | | | Additives (wt %) | | | | εs *1 | tan δ *2 (%) | IR (Ω) *3 ×10$^{11}$ | AC·Eb *4 (KV/mm) | ΔC (%) *5 85° C. | Sint. *6 |
|---|---|---|---|---|---|---|---|---|---|---|---|---|---|---|---|
| | | BaTiO$_3$ | BaZrO$_3$ | CaTiO$_3$ | MgTiO$_3$ | NiO | CeO$_2$ | MnO | SiO$_2$ | | | | | | |
| 22 | O | 62.5 | 13.1 | 21.4 | 3.0 | 0.05 | 0.18 | 0.05 | 0.00 | 4310 | 0.21 | 1.0 | 4.4 | −45 | O |
| 23 | O | 62.5 | 13.1 | 21.4 | 3.0 | 0.20 | 0.18 | 0.05 | 0.00 | 4409 | 0.81 | 6.5 | 4.8 | −53 | O |
| 24 | O | 62.5 | 13.1 | 21.4 | 3.0 | 0.40 | 0.18 | 0.05 | 0.00 | 4250 | 0.70 | 6.3 | 4.9 | −50 | O |
| 25 | X | 62.5 | 13.1 | 21.4 | 3.0 | 0.50 | 0.18 | 0.05 | 0.00 | 3230 | 1.30 | 5.3 | 4.7 | −47 | X |
| 26 | O | 62.5 | 13.1 | 21.4 | 3.0 | 0.20 | 0.05 | 0.05 | 0.00 | 4310 | 0.40 | 5.7 | 4.7 | −52 | ⊙ |
| 27 | O | 62.5 | 13.1 | 21.4 | 3.0 | 0.20 | 0.30 | 0.05 | 0.00 | 4160 | 0.30 | 9.5 | 5.3 | −54 | O |
| 28 | X | 62.5 | 13.1 | 21.4 | 3.0 | 0.20 | 0.35 | 0.05 | 0.00 | 3850 | 0.21 | 10.2 | 5.0 | −58 | X |
| 29 | O | 62.5 | 13.1 | 21.4 | 3.0 | 0.20 | 0.18 | 0.03 | 0.00 | 4392 | 0.33 | 6.5 | 4.8 | −54 | O |
| 30 | O | 62.5 | 13.1 | 21.4 | 3.0 | 0.20 | 0.18 | 0.10 | 0.00 | 4720 | 0.42 | 4.2 | 4.6 | −53 | ⊙ |
| 31 | O | 62.5 | 13.1 | 21.4 | 3.0 | 0.20 | 0.18 | 0.20 | 0.00 | 4170 | 0.35 | 4.7 | 4.6 | −52 | O |
| 32 | X | 62.5 | 13.1 | 21.4 | 3.0 | 0.20 | 0.18 | 0.50 | 0.00 | 2890 | 1.80 | 4.3 | 2.0 | −50 | X |
| 33 | O | 62.5 | 13.1 | 21.4 | 3.0 | 0.20 | 0.18 | 0.05 | 0.05 | 4520 | 0.32 | 6.3 | 4.8 | −50 | ⊙ |
| 34 | O | 62.5 | 13.1 | 21.4 | 3.0 | 0.20 | 0.18 | 0.05 | 0.25 | 4220 | 0.37 | 7.0 | 4.5 | −46 | O |
| 35 | X | 62.5 | 13.1 | 21.4 | 3.0 | 0.20 | 0.18 | 0.05 | 0.50 | 2930 | 0.40 | 7.1 | 3.5 | −41 | X |
| 36 | X | 62.5 | 13.1 | 21.4 | 3.0 | 0.00 | 0.00 | 0.00 | 0.00 | 1630 | 0.71 | 0.7 | 2.2 | −32 | X |
| 37 | X | 62.5 | 13.1 | 21.4 | 3.0 | 0.00 | 0.18 | 0.05 | 0.00 | 2730 | 0.36 | 0.9 | 2.9 | −44 | X |
| 38 | X | 62.5 | 13.1 | 21.4 | 3.0 | 0.20 | 0.00 | 0.05 | 0.00 | 3940 | 0.53 | 1.2 | 3.5 | −47 | X |
| 39 | X | 62.5 | 13.1 | 21.4 | 3.0 | 0.20 | 0.18 | 0.00 | 0.00 | 3210 | 0.60 | 1.2 | 4.5 | −49 | X |

*1, dielectric constant;
*2, dielectric loss;
*3, insulation resistance;
*4, breakdown voltage;
*5, rate of change in capacitance;
*6, degree of sintering Of the samples of dielectric ceramic compositions shown in Tables 1 and 2, sample Nos. 2 to 6, 8, 9, 12 to 14, 17 to 20, 22 to 24, 26, 27, 29 to 31, 33 and 34 which are within the range of the dielectric ceramic composition of the present invention showed excellent electric properties of 4,000 or more in relative dielectric constant and 4.0 kV/mm or more (preferably 4.5 kV/mm or more) in alternating breakdown voltage. Their degree of sintering was also relatively good, and dielectric ceramic composition sample Nos. 26, 30 and 33 showed particularly excellent degree of sintering.

On the other hand, dielectric ceramic compositions of sample Nos. 1, 16, 21, 25, 28, 32 and 35 to 39 have a relative dielectric constant of less than 4,000 and therefore are outside the range of the present invention, and dielectric ceramic compositions of sample Nos. 1, 7, 10, 11, 15, 32 and 35 to 38 are also outside the range of the present invention because of their low alternating breakdown voltage of less than 4.0 kV/mm. In addition, dielectric ceramic compositions of sample Nos. 10, 11, 16, 21, 25, 28, 32 and 35 to 39 showed poor degree of sintering.

Next, reasons for the limitation of the range of the present invention are described in the following.

(1) The content of barium titanate ($BaTiO_3$) as a main component:

When the content of barium titanate as a main component is less than 60.3 mol % (sample No. 1), relative dielectric constant decreases sharply and alternating breakdown voltage also decreases. On the other hand, when the content of barium titanate is larger than 67.5 mol % (sample No. 10), dielectric loss increases sharply and alternating breakdown voltage decreases. In consequence, it is desirable that the content of barium titanate is within the range of from 60.3 to 67.5 mol %, preferably from 60.3 to 66.0 mol %, more preferably from 62.0 to 63.0 mol %

(2) The content of barium zirconate ($BaZrO_3$) as a main component:

When the content of barium titanate as a main component is less than 11.9 mol % (sample Nos. 10 and 11), dielectric loss increases sharply and alternating breakdown voltage decreases. On the other hand, when the content of barium zirconate is larger than 15.6 mol % (sample No. 16), dielectric loss is reduced, but relative dielectric constant decreases and rate of change in capacitance due to temperature becomes large. In consequence, it is desirable that the content of barium zirconium is within the range of from 11.9 to 15.6 mol %, preferably from 12.1 to 15.6 mol %, more preferably from 12.5 to 13.5 mol %.

(3) The content of calcium titanate ($CaTiO_3$) as a main component:

When the content of calcium titanate as a main component is less than 15.8 mol % (sample No. 7), alternating breakdown voltage sharply decreases and rate of change in capacitance due to temperature becomes large. On the other hand, when the content of calcium titanate is larger than 23.0 mol % (sample No. 1), relative dielectric constant decreases sharply and alternating breakdown voltage also decreases. In consequence, it is desirable that the content of calcium titanate is within the range of from 15.8 to 23.0 mol %, preferably from 20.5 to 22.0 mol %.

(4) The content of magnesium titanate ($MgTiO_3$) as a main component:

When the content of magnesium titanate as a main component is less than 2.6 mol % (sample No. 15), alternating breakdown voltage decreases and rate of change in capacitance due to temperature becomes large. On the other hand, when the content of magnesium titanate is larger than 5.8 mol % (sample No. 21), relative dielectric constant decreases and degree of sintering becomes poor. In consequence, it is desirable that the content of magnesium titanate is within the range of from 2.6 to 5.8 mol %, preferably from 2.6 to 3.9 mol %, more preferably from 2.6 to 3.5 mol %.

(5) The content of nickel oxide (NiO) as an additive:

When the content of nickel oxide as an additive is less than 0.05 wt % (sample No. 37), relative dielectric constant and alternating breakdown voltage decrease. On the other hand, when the content of nickel oxide is larger than 0.4 wt % (sample No. 25), not only relative dielectric constant decreases and dielectric loss increases, but also degree of sintering becomes poor. In consequence, it is desirable that the content of nickel oxide is within the range of from 0.05 to 0.4 wt %, preferably 0.05 to 0.3 wt %, more preferably from 0.15 to 0.25 wt %.

(6) The content of cerium oxide ($CeO_2$) as an additive:

When the content of cerium oxide as an additive is less than 0.05 wt % (sample No. 38), relative dielectric constant decreases and dielectric loss increases. On the other hand, when the content of cerium oxide is larger than 0.3 wt % (sample No. 28), not only relative dielectric constant decreases and rate of change in capacitance due to temperature becomes large, but also degree of sintering becomes poor. In consequence, it is desirable that the content of cerium oxide is within the range of from 0.05 to 0.3 wt %, preferably from 0.05 to 0.18 wt %, more preferably from 0.10 to 0.18 wt %.

(7) The content of manganese oxide (MnO) as an additive:

When the content of manganese oxide as an additive is less than 0.03 wt % (sample No. 39), relative dielectric constant decreases and degree of sintering becomes poor. On the other hand, when the content of manganese oxide is larger than 0.2 wt % (sample No. 32), relative dielectric constant and alternating breakdown voltage decrease sharply and dielectric loss increases. In consequence, it is desirable that the content of manganese oxide is within the range of from 0.03 to 0.2 wt %, preferably from 0.03 to 0.05 wt %.

(8) The content of silicon oxide ($SiO_2$) as an additive:

When the content of silicon oxide as an additive is larger than 0.25 wt % (sample No. 35), relative dielectric constant decreases sharply and alternating breakdown voltage also decreases. In this case, degree of sintering also becomes poor because of base material adhesion at the time of sintering. In consequence, it is desirable that the content of silicon oxide is within the range of from 0.0 to 0.25 wt %, preferably 0.0 to 0.05 wt %, more preferably from 0.0 to 0.01 wt %.

(9) The presence of additives:

When the aforementioned additives are entirely absent (sample No. 36), relative dielectric constant and alternating breakdown voltage decrease and degree of sintering becomes poor.

The dielectric ceramic composition of the present invention has a high relative dielectric constant of 4,000 or more and a high alternating breakdown voltage of 4 kV/mm or more and is small in dielectric loss and rate of change in capacitance due to temperature. In consequence, it is useful particularly as high voltage condensers, high voltage feedthrough capacitors and the like.

While the invention has been described in detail and with reference to specific examples thereof, it will be apparent to one skilled in the art that various changes and modifications can be made therein without departing from the spirit and scope thereof.

What is claimed is:

1. A dielectric ceramic composition having the composition represented by formula (1):

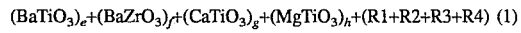

$$(BaTiO_3)_e + (BaZrO_3)_f + (CaTiO_3)_g + (MgTiO_3)_h + (R1 + R2 + R3 + R4) \quad (1)$$

wherein e is from 60.3 to 67.5 mol %, f is from 11.9 to 15.6 mol %, g is from 15.8 to 23.0 mol %, and h is from 2.6 to 5.8 mol %; provided that the total of e, f, g, and h is 100% mol; and R1 is from 0.05 to 0.4 wt % of NiO, R2 is from 0.05 to 0.3 wt % of $CeO_2$, R3 is from 0.03 to 0.2 wt % of MnO, and R4 is from 0.0 to 0.25 wt % of $SiO_2$, all based on 100 mol % in total of $BaTiO_3$, $BaZrO_3$, $CaTiO_3$, and $MgTiO_3$, wherein said composition has a dielectric constant of 4,000 or more and an alternating breakdown voltage of 4 kV/mm or more.

2. A dielectric ceramic composition as claimed in claim 1, wherein e is from 60.3 to 66.0 mol %, f is from 12.1 to 15.6 mol %, g is from 15.8 to 23.0 mol % and h is from 2.6 to 3.9 mol %, provided that the total of e, f, g, and h is 100 mol %; and R1 is from 0.05 to 0.3 wt % of NiO, R2 is from 0.05 to 0.18 wt % of $CeO_2$, R3 is from 0.03 to 0.05 wt % of MnO, and R4 is from 0.0 to 0.05 wt % of $SiO_2$, all on 100 mol % in total of $BaTiO_3$, $BaZrO_3$, $CaTiO_3$, and $MgTiO_3$.

3. A dielectric ceramic composition as claimed in claim 2, wherein e is from 62.0 to 63.0 mol % f is from 12.5 to 13.5 mol %, g is from 20.5 to 22.0 mol %, and h is from 2.6 to 3.5 mol %, provided that the total of e, f, g, and h is 100 mol %; and R1 is from 0.15 to 0.25 wt % of NiO, R2 is from 0.10 to 0.18 wt % of $CeO_2$, R3 is from 0.03 to 0.05 wt % of MnO, and R4 is from 0.0 to 0.01 wt % of $SiO_2$, all based on 100 mol % in total of $BaTiO_3$, $BaZrO_3$, $CaTiO_3$, and $MgTiO_3$.

* * * * *